US006732476B2

(12) United States Patent
Mehalshick et al.

(10) Patent No.: US 6,732,476 B2
(45) Date of Patent: May 11, 2004

(54) WIRELESS BARRIER-EDGE MONITOR METHOD

(75) Inventors: George M. Mehalshick, Hazleton, PA (US); Christopher J. Staub, Mountaintop, PA (US); Kevin Pongrazzi, Beaver Meadows, PA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/075,050

(22) Filed: Feb. 12, 2002

(65) Prior Publication Data

US 2003/0150164 A1 Aug. 14, 2003

(51) Int. Cl.[7] ............................ E05F 15/20; H02P 1/00
(52) U.S. Cl. ................................ 49/506; 49/26; 49/27
(58) Field of Search ............................... 49/26, 27, 28, 49/506; 318/280, 282, 283; 160/188, 310

(56) References Cited

U.S. PATENT DOCUMENTS 5,127,190 A * 7/1992 Hein et al. ..................... 49/31
5,412,297 A 5/1995 Clark et al.
5,493,812 A 2/1996 Teich
5,517,575 A * 5/1996 Ladewski ................... 382/108
5,584,145 A 12/1996 Teich
5,596,840 A 1/1997 Teich
5,625,980 A 5/1997 Teich et al.
5,949,207 A * 9/1999 Luebke et al. .............. 318/446
6,225,768 B1 5/2001 Cookson et al.
6,469,524 B1 * 10/2002 Oberdier ..................... 324/688
2002/0065083 A1 * 5/2002 Patel .......................... 455/452
2003/0023881 A1 * 1/2003 Fitzgibbon et al. ......... 713/202

OTHER PUBLICATIONS

International Search Report for PCT patent application PCT/US03/03785 completed on Jun. 25, 2003.
"Security Gate Systems." 2 pp. Jan. 31, 2002. <http://www.simplygates.com/acon–16html>.
"Linear MegaCode Radio Controls for Gate Operators and Garage Door Openers." 3 pp. Hoover Fence Co. Jan. 31, 2002. <http://www.hooverfence.com/catalog/entry__systems/linear/megacode.htm>.
"Phantom Featheredge." May 30, 2001: 2pp. Cookson Company Jan. 31, 2002 <http://www.cooksondoor.com/newpages/corporate/phanedge.html>.
"Door Minder" 2 pp. Martec Access Products Jan. 1, 2002. <http.//www.martecaccess.com/.

* cited by examiner

*Primary Examiner*—Gregory J. Strimbu
(74) *Attorney, Agent, or Firm*—Fitch, Even, Tabin & Flannery

(57) ABSTRACT

A remote unit (14) couples to an obstacle detection sensor (13) to both detect an obstacle in the path of a movable barrier (11) and operability of the obstacle detection sensor (13) itself. Information regarding these and, optionally, other parameters (such as battery status) is coded and transmitted as a short burst wireless transmission to an interface unit (15). The interface unit (15) decodes the message and provides controlling information to a movable barrier operator (12) as appropriate when an obstacle is present, when the sensor (13) is faulty, or when other monitored parameters are out of normal bounds. In addition, the interface unit (15) can provide local alarms (auditory and visual) when detecting one or more of the above conditions.

15 Claims, 5 Drawing Sheets

WIRELESS BARRIER-EDGE MONITOR METHOD

TECHNICAL FIELD

This invention relates generally to movable barrier operators and more particularly to obstacle detection.

BACKGROUND

Various kinds of movable barriers are known, including gates, doors, shutters and the like that move or pivot in horizontal or vertical directions to move between open and closed positions. Movable barrier operators of various kinds that effect motorized and controlled movement of such movable barriers are also known. Safety concerns exist with movable barrier operators. In particular, at least in some settings, care should be taken to ensure that a barrier that is moving to a closed position does not impact an obstacle and cause damage to either the obstacle or the barrier. The prior art proposes various solutions to address this issue.

Pursuant to one approach, an obstacle sensor attached to a leading edge of the movable barrier can detect an obstacle and provide a signal to the movable barrier operator to cause the operator to reverse movement of the barrier. Such sensors include switch style compressible strips having electrical conductors disposed therein that complete a circuit when the conductors are urged towards one another as the leading edge makes initial contact with an obstacle. Other sensors include pneumatic style sensors and light beam style sensors. Unfortunately, such sensors can themselves be damaged. When damaged, the sensor may no longer reliably detect an obstacle and thereby give rise to concerns regarding safe operation of the movable barrier.

The prior art suggests that an obstacle sensor can be tested from time to time to determine viability of the sensor. Towards this end, for example, a resistance can be added to a switch style compressible strip to facilitate detection of an open circuit that would indicate damage to the sensor. Unfortunately, such testing ability must ordinarily reside in proximity to the sensor itself and hence on the movable barrier itself. Wireless sensor interfaces are desired (to minimize the use of electrical supply and signaling cable on the door) but this typically requires the use of portable power supplies, such as batteries. To meet the limitations associated with such circumstances, prior art sensor interfaces only test sensor viability, if at all, infrequently (for example, once every ten minutes) or on an event-driven basis (for example, immediately following each closing of the door). Such infrequent or sporadic testing offers a considerable window of opportunity following damage to a sensor during which damage to the barrier or to an obstacle can occur.

BRIEF DESCRIPTION OF THE DRAWINGS

The above needs are at least partially met through provision of the wireless barrier-edge monitor device and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

Generally speaking, pursuant to these various embodiments, a first unit is mounted on a movable barrier and is operably coupled to an obstacle sensor. This first unit has both an obstacle detection capability and a testing capability to facilitate determining the operability status of the obstacle sensor. Information regarding both the viability of the sensor and the presence or absence of obstacles is coded and transmitted via a wireless transmitter to a second unit that is operably coupled to the movable barrier operator for the movable barrier. Such transmissions are provided at least once every two seconds and about once each second in a preferred embodiment. Also in a preferred embodiment, these transmissions comprise a short burst transmission that consumes little power. The minimal power requirements of this approach suggest usable battery life of one year or more. As a result, viability of the obstacle sensor can be assessed on effectively a continuous basis while simultaneously achieving the benefits of a wireless embodiment without the difficulties presented by a rapidly depleting power source.

The second unit noted above has a wireless receiver to receive the message from the first unit. Received messages are decoded and the recovered information used to at least indicate to the movable barrier operator when an obstacle is present or when the obstacle sensor is inoperable. The operator can use this information to reverse the direction of the movable barrier. In the case of an inoperable sensor, the operator can prohibit movement of the movable barrier from an opened position until the sensor has been repaired, thereby effectively providing fail-safe operation of the barrier. The second unit can also, in a preferred embodiment, use the recovered information to provide alarm information such as, for example, audible alarm sounds and/or visible alarm indicators. Different alarms can be used to signify different monitored events.

Figure 1:
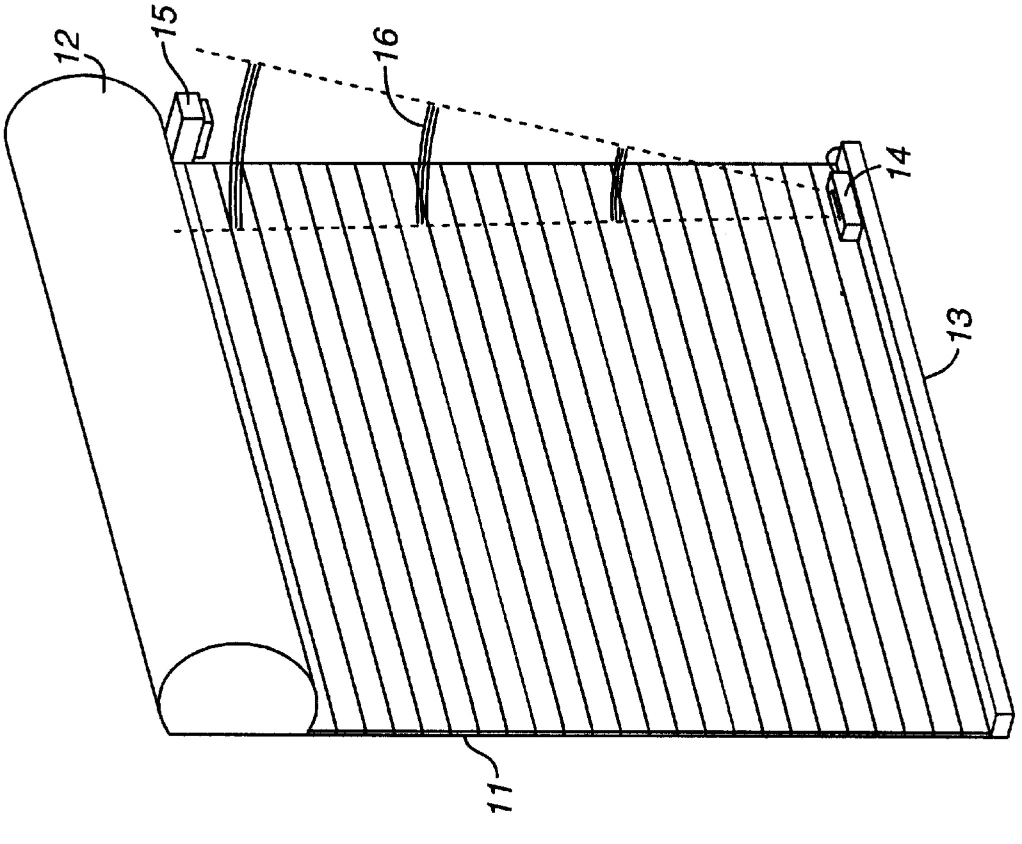
FIG. 1 comprises a simplified perspective view of a movable barrier and operator having a wireless barrier-edge monitor device configured in accordance with an embodiment of the invention.

Referring now to the drawings, and in particular to FIG. 1, various embodiments of the invention will be presented as used in conjunction with a segmented movable barrier 11 that moves vertically between open and closed positions through action of a corresponding movable barrier operator 12 as well understood in the art. This particular movable barrier embodiment is exemplary only and it should be understood that the benefits of the invention can be realized with virtually any movable barrier assembly. A switch style obstacle sensor 13 is affixed to the leading edge of the movable barrier 11 and a barrier-mounted remote unit 14 is affixed to the barrier 11 proximal to the sensor 13. An interface unit 15 that receives wireless signals 16 from the remote unit 14 mounts proximal to the operator 12 and couples operably thereto to provide signals to the operator 12 regarding obstacle detection and sensor operability. In this embodiment, the wireless signals 16 are infrared signals. It should be understood that any wireless communication medium can be used, including but not limited to radio frequency signals, ultrasonic signals, and other light frequency signals, alone or in combination.

Figure 2:
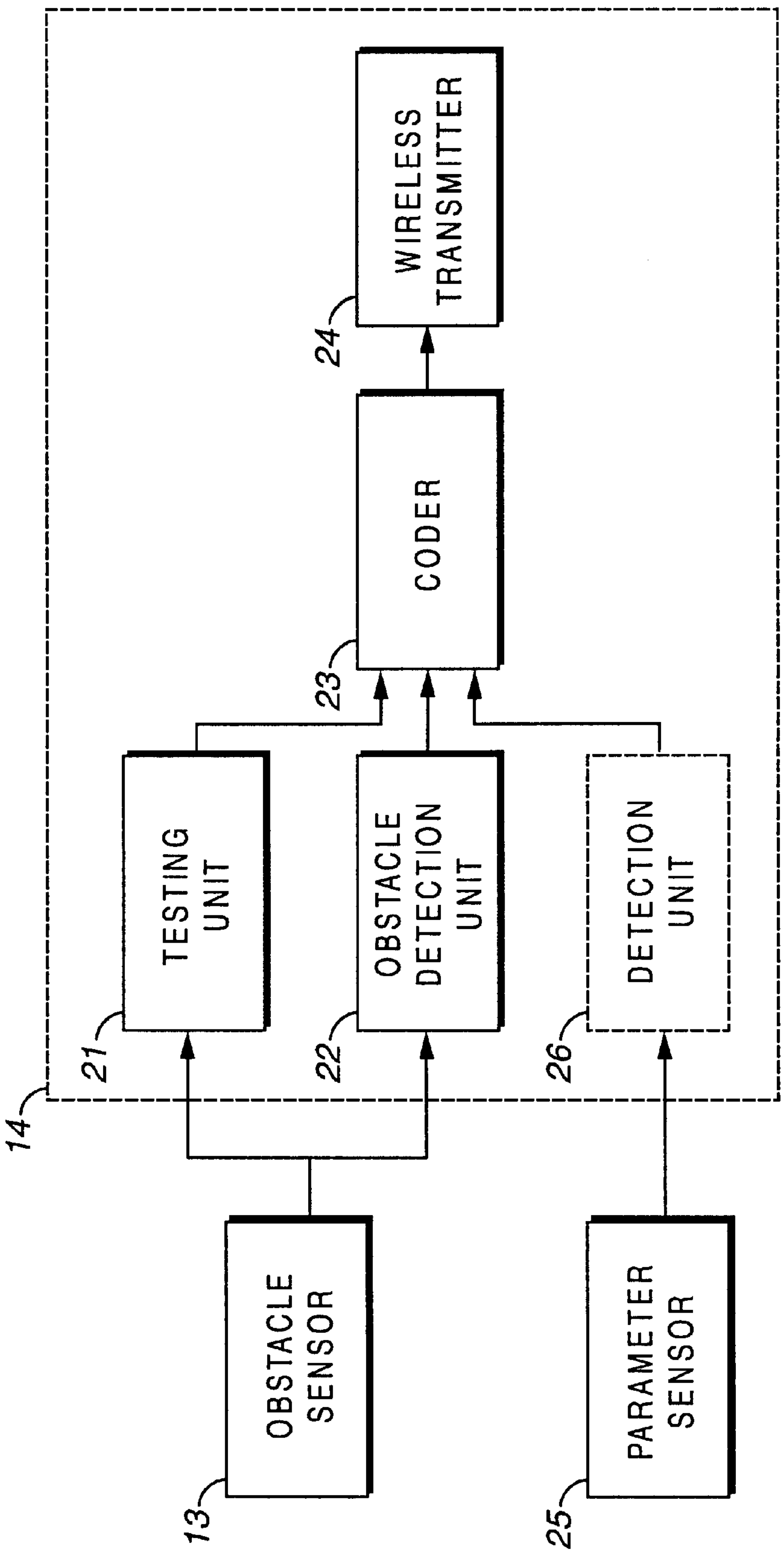
FIG. 2 comprises a block diagram of an embodiment configured in accordance with the invention.

Referring now to FIG. 2, the remote unit 14 includes a testing unit 21 and an obstacle detection unit 22 that couple to the obstacle sensor 13. The testing unit 21 serves to assess operability of the sensor 13. For example, when the obstacle sensor 13 is a switch style sensor having a resistance disposed between two obstacle-detecting conductors, a voltage applied to the conductors will serve to readily detect when the sensor 13 suffers damage that causes an open circuit to the conductors. Such an open circuit can be sensed by the testing unit 21. The obstacle detection unit 22 is responsive to signal indications from the sensor 13 that indicate an obstacle. Both the testing unit 21 and the obstacle detection unit 22 can be comprised of appropriate circuitry and/or logic/programming as appropriate to a given application.

The outputs of the testing unit 21 and the obstacle detection unit 22 are provided to a coder 23. The coder 23 provides an output comprising, in this embodiment, an 8 bit digital word. The bits comprising the word correspond to various states of conditions that are monitored by the remote unit 14. In this embodiment, the digital words each represent whether an obstacle is presently detected and whether the obstacle sensor 13 is operable. The output of the coder 23 couples to a wireless transmitter 24 that transmits the digital word in a short burst transmission. These bursts are, in this embodiment, strictly speaking non-synchronous but are sent nevertheless on a regular basis. At least once every two seconds is appropriate, with once about each second being preferred.

It is of course possible for the remote unit 14 to monitor other conditions and to include indications of those conditions in the coded messages as sent by the wireless transmitter 24. For example, and with continued reference to FIG. 2, another barrier operation parameter can be sensed by a corresponding parameter sensor 25 and a detection unit 26 within the remote unit 14 can serve to interface with the parameter sensor 25 and thereby detect the monitored condition. For example, high speed barriers (often made of fabric) are available that move between open and closed positions at high speed. Such high speed barriers are sometimes dislodged from their travel tracks (in fact, some such barriers are specifically designed to allow for relatively easy dislodgment in order to minimize damage from collisions between moving objects and the barrier). Sensors are available to sense such dislodging and can serve here as the parameter sensor 25. So configured, the remote unit 14 can include information regarding the dislodged status of the monitored barrier in the digital word as coded by the coder 23 and transmitted by the wireless transmitter 24.

Figure 3:
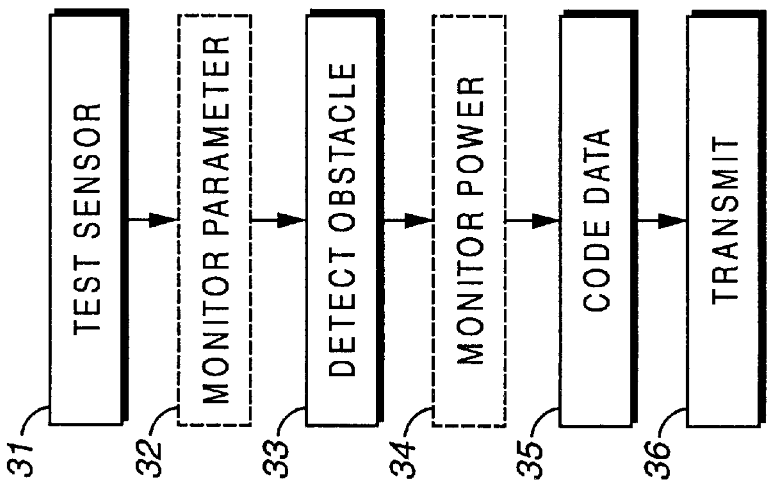
FIG. 3 comprises a flow diagram of an embodiment configured in accordance with the invention.

Referring now to FIG. 3, operation of the remote unit 14 can be seen to essentially consist of testing 31 the obstacle detection sensor, optionally monitoring 32 one or more other barrier operation parameters as noted above, and detecting 33 obstacles as may be presented to the travel path of the barrier. In addition, and as described below, the remote unit 14 can also monitor 34 its own power source. For example, presuming the power source is a battery, the capacity of the battery can be assessed. All of the above data is then coded 35 and transmitted 36 as described above. The single short burst transmission comprises a digital word that provides status information regarding all of these monitored conditions.

So configured, the remote unit 14 can reliably and essentially continuously monitor for events such as obstacles and sensor integrity and provide essentially constant updates regarding these conditions via a wireless connection without necessitating high power consumption that would in turn require frequent attention and maintenance. A year of more of constant operation in the mode described is readily realizable.

Figure 4:
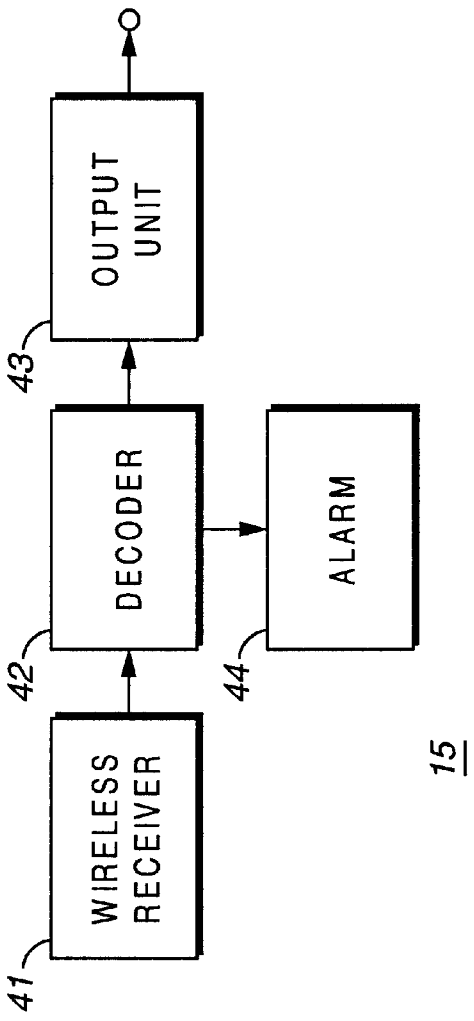
FIG. 4 comprises a block diagram of an embodiment configured in accordance with the invention.

Referring now to FIG. 4, the interface unit 15 comprises a wireless receiver 41 that can compatibly receive the wireless transmissions emitted by the remote unit 14. The wireless receiver 41 couples to a decoder 42 that recovers the information in the digital word. This information is then routed appropriately. In this embodiment, an output unit 43 couples to the decoder 42 and serves to provide signals to the movable barrier operator regarding obstacles, defective sensors, and other monitored parameters (as described below in more detail). Optionally, one or more alarms 44 can also couple to the decoder 42 to provide a local alert of specific monitored conditions. For example, the alarm 44 can be one or more audible alerts and/or indicator lights or other visible alert signal. A first alarm sound can be used to signal when the obstacle sensor is defective, and another alarm sound can be used to signal when another monitored parameter, such as a tracking integrity condition, is outside of normal operating bounds.

Figure 5:
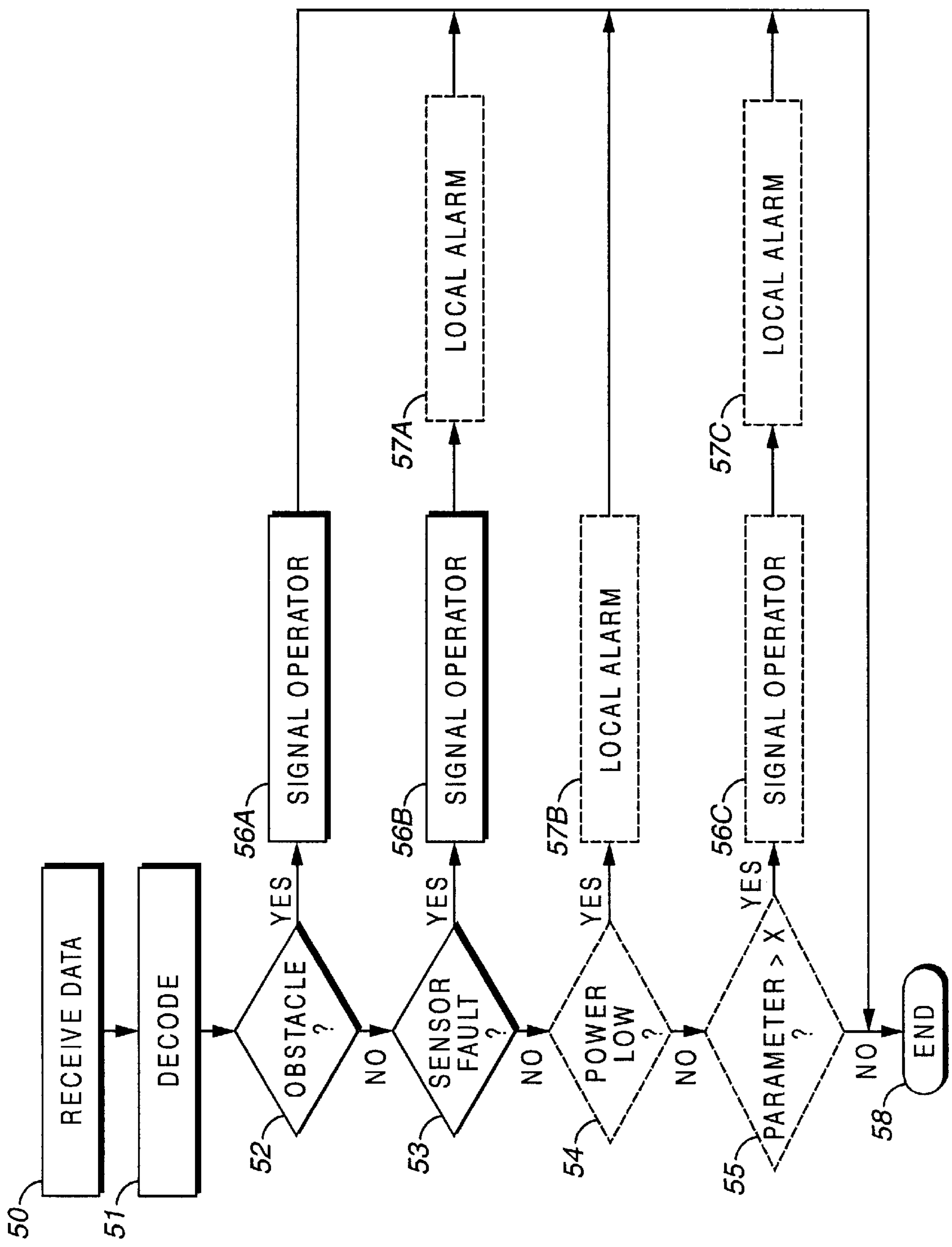
FIG. 5 comprises a flow diagram of an embodiment configured in accordance with the invention.

Referring now to FIG. 5, the interface unit 15 essentially operates as follows. Upon receiving 50 data and decoding 51 it to recover the information from the digital word, the interface unit 15 can sequentially assess whether an obstacle has been detected 52, the obstacle detection sensor is faulty 53, and optionally whether battery capacity for the remote unit 14 is low 54 or any other monitored parameter (such as tracking integrity) is outside of normal operating bounds 55. When such conditions are detected, the interface unit 15 responds accordingly by providing (56A, 56B, and 56C) an appropriate signal to the movable barrier operator and/or by providing (57A, 57B, and 57C) an appropriate local alarm. The signals as provided to the movable barrier operator can either by indicative of condition status such that the operator may itself determine an appropriate response or the signals can themselves be controlling as to the specific action to be taken by the operator. For example, when an obstacle is detected, the operator could be instructed to reverse direction of the barrier and to return to a ally opened position. When the obstacle detection sensor is faulty, the operator could be instructed to again reverse direction of the barrier, to return to the open position, and to not move again towards a closed position until the sensor is repaired or replaced. And, when the barrier has been dislodged from the track, the operator could be instructed to stop without reversing direction (as reversing direction when the barrier is dislodged may lead to damage of the barrier, the track, or other surfaces in the vicinity). The process then ends 58 and awaits receipt of another message.

So configured, the interface unit 15 receives status information from the remote unit 14 regarding both the barrier and the remote unit 14 itself and takes corresponding actions to both alert users in the vicinity and to influence or control actions of the operator with respect to the movable barrier.

Figure 6:
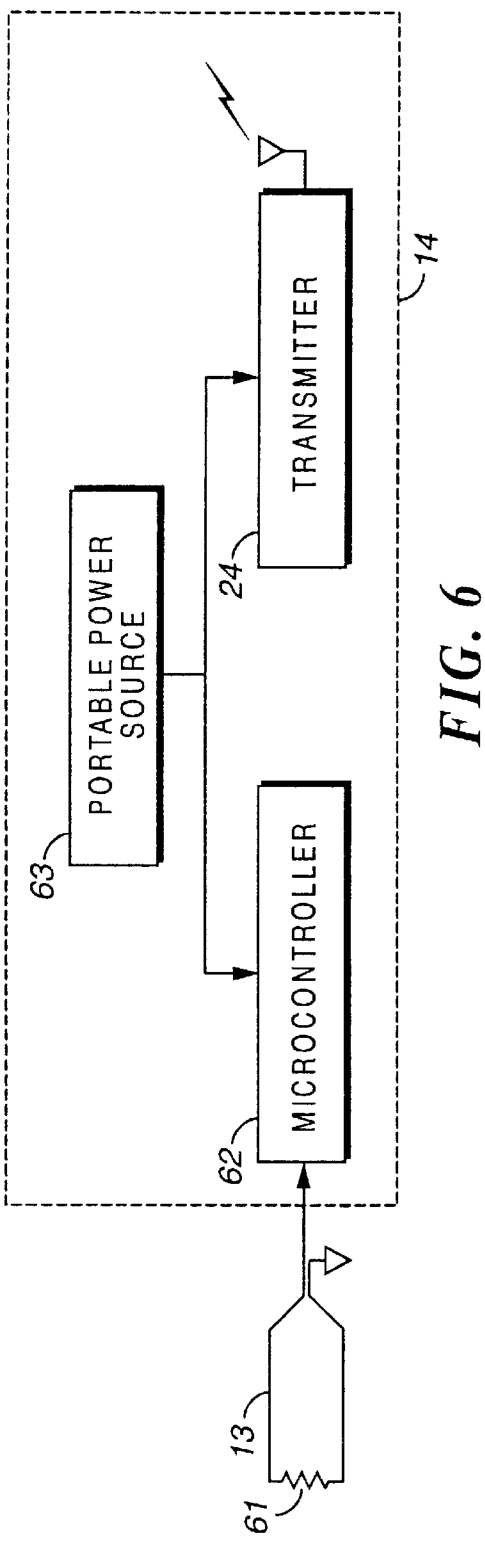
FIG. 6 comprises a block diagram of another embodiment configured in accordance with the invention.

There are various ways to embody the above teachings. In addition to use of various wireless communication techniques, the activities of the remote unit 14 and the interface unit 15 can be accomplished through use of discrete or integrated circuitry and/or programmable platforms. A microcontroller-based approach will now be described with reference to FIGS. 6 and 7. In FIG. 6, the remote unit 14 can be comprised substantially of a microcontroller 63, portable power source 63, and wireless transmitter 24. The microcontroller 63 is programmed to function as described above. In this embodiment, the obstacle detection sensor 13 comprises a switch style sensor that includes a resistor 61 connected between the two opposing conductors to facilitate operability monitoring. Importantly, the microcontroller 62 can be placed in a so-called sleep mode for most of the time. Interrupts can be used to awaken the microcontroller 62 to effect the functionality disclosed above. For example, a clock-based interrupt can be used to awaken the microcontroller 62 once each second to gather data, encode the data, and effect a burst transmission as described above (these steps can typically be achieved within a short operating window of, for example, 50 microseconds). As a result, the microcontroller 62 need only function in a higher-power mode for a small fraction of the time.

Figure 7:
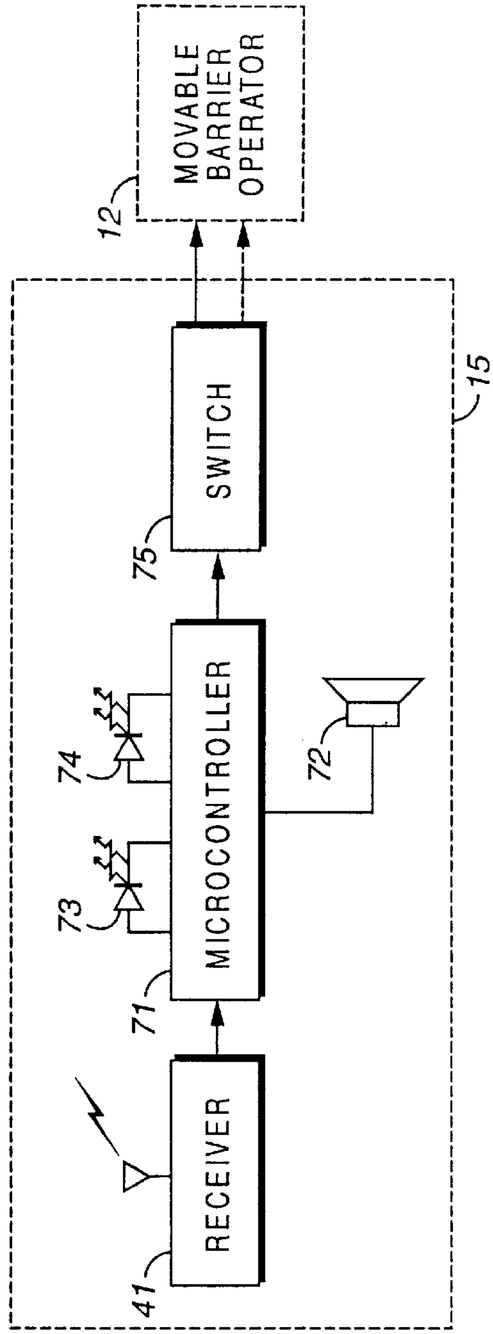
FIG. 7 comprises a block diagram of another embodiment configured in accordance with the invention.

FIG. 7 presents the interface unit 15 as also having a microcontroller 71 programmed to function as described above and being coupled to the wireless receiver 41. In this embodiment, the microcontroller 71 couples to an acoustic transducer 72 to provide one or more alarm sounds as described above and to two light emitting diodes 73 and 74. The first diode 73 can be colored green, for example, and can serve to signal each successful reception of a message from the remote unit 14. This heartbeat signal provides a simple and effective way to inform an observer that the system is functioning properly under quiescent conditions. The second diode 74 can be colored red, for example, and can serve to signal an alarm condition (such as, for example, that the obstacle alarm sensor 13 is faulty). The microcontroller 71 also couples, in this embodiment, to a switch 75. This switch 75 can comprise, for example, a relay switch that in turn couples to the movable barrier operator 12. Through these means the interface unit 15 can signal to the operator 12 when an obstacle is detected or the sensor becomes faulty. If desired, and to support provision of signals that are intended to result in different operator actions, one or more additional relay switches can be provided. For example, an additional relay switch can be used to support providing a signal to the operator when the movable barrier becomes dislodged with respect to its tracks.

So configured, the various attributes and benefits of the invention are realized in a readily programmable platform that is cost effective, compact, and utilizes little power during operation. Operable status of the obstacle detection sensor is continuously monitored and used to continuously influence the operation of the movable barrier operator. The wireless connectivity ensures that these devices are easily installed and relatively trouble-free during use. The short burst transmissions coupled with low power non-transmission modes of operation contribute to long battery life.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, the remote units 14 can include an identifier (either a unique identification number or a simple A/B indicator) within the digital word or concatenated therewith to support use of multiple such units within a shared operational venue. As another example, the interface unit 15 can utilize a watchdog timer approach to detect that the remote unit 14 has not transmitted any messages for more than an acceptable period of time (such as, for example, 1.2 seconds). Upon detecting such a lack of transmission, the interface unit 15 could sound a corresponding alarm and signal the movable barrier operator to move the movable barrier to a fully opened position until transmissions again resume. As yet another example, instead of using switching to interface between the interface unit 15 and the movable barrier operator 12, a data bus could be used to provide data messaging to convey the relevant information.

We claim:

1. A method for use with a movable barrier having an obstacle sensor affixed thereto and a movable barrier operator operably coupled to the movable barrier, comprising:

at a first location:

substantially continuously monitoring the obstacle sensor to determine both that the obstacle sensor is operable and when an obstacle has been detected by the obstacle sensor;

though not receiving any wirelessly transmitted messages, substantially continuously repeatedly wirelessly transmitting short burst messages, at least some of which messages include information regarding whether the obstacle has detected by the obstacle sensor and whether the obstacle sensor is operable;

at a second location, which second location is remote from the first location:

receiving the short burst messages and extracting the information regarding whether the obstacle has been detected by the obstacle sensor and whether the obstacle sensor is operable;

notifying the movable barrier operator whenever either the obstacle sensor detects the obstacle and when the obstacle sensor is not operable.

2. The method of claim 1 wherein the substantially continuously monitoring the obstacle sensor to determine that the obstacle sensor is operable includes testing the obstacle sensor at least once every two seconds.

3. The method of claim 2 wherein the substantially continuously monitoring the obstacle sensor to determine that the obstacle sensor is operable includes testing the obstacle sensor at least once about every second.

4. The method of claim 1 wherein the substantially continuously repeatedly wirelessly transmitting short burst messages includes substantially continuously repeatedly wirelessly transmitting short burst messages such that one of said short burst messages is transmitted at least once every two seconds.

5. The method of claim 4 wherein the substantially continuously repeatedly wirelessly transmitting short burst messages includes substantially continuously repeatedly wirelessly transmitting short burst messages such that the one of said short burst messages is transmitted at least once about every second.

6. The method of claim 1 and further comprising:

at the second location:

providing an alarm whenever the obstacle sensor is not operable.

7. The method of claim 6 providing the alarm includes providing an audible alarm.

8. The method of claim 6 wherein providing the alarm includes providing a visual alarm.

9. The method further comprising:

at the first location:

monitoring at least one portable power source;

and wherein the substantially continuously repeatedly wirelessly transmitting short burst messages, at least some of which messages include information regarding whether the obstacle has been detected by the obstacle sensor and whether the obstacle sensor is operable includes substantially continuously repeatedly wirelessly transmitting short burst messages, at least some of which messages include information regarding a status of the at least one portable power source.

10. The method of claim 9 and further comprising:

at the second location:

providing a first alarm whenever the obstacle sensor is not operable; and providing a second alarm whenever the status of the at least one portable power source reaches a predetermined threshold.

11. The method of claim 10 wherein the providing a first alarm includes providing a first audible alarm and wherein the providing a second alarm includes providing a second audible alarm, wherein the first audible alarm is different than the second audible alarm.

12. The method of claim 1 and further comprising:

at the first location:

substantially continuously monitoring a movable barrier operational parameter;

and wherein the substantially continuously repeatedly wirelessly transmitting short burst messages, at least some of which messages include information regarding whether the obstacle has been detected by the obstacle sensor and whether the obstacle sensor is operable includes substantially continuously repeatedly wirelessly transmitting short burst messages, at least some of which messages include information regarding the movable barrier operational parameter.

13. A method for use with a movable barrier having an obstacle sensor affixed thereto and a movable barrier operator operably coupled to the movable barrier, comprising:

at a first location:

substantially continuously monitoring the obstacle sensor to determine both that the obstacle sensor is operable and when an obstacle has been detected by the obstacle sensor;

substantially continuously monitoring a movable barrier operational parameter comprising alignment between the movable barrier and a corresponding movable barrier track;

though not receiving any wirelessly transmitted messages, substantially continuously repeatedly wirelessly transmitting short burst messages, at least some of which messages include information regarding whether the obstacle has been detected by the obstacle sensor information regarding whether the obstacle sensor is operable, and information regarding the movable barrier operational parameter;

at a second location, which second location is remote from the first location:

receiving the short burst messages and extracting the information regarding whether the obstacle has been detected by the obstacle sensor and whether the obstacle sensor is operable;

notifying the movable barrier operator whenever either the obstacle sensor detects the obstacle and when the obstacle sensor is not operable.

14. The method of claim 13 wherein the notifying the movable barrier operator whenever either the obstacle sensor detects the obstacle and when the obstacle sensor is not operable includes notifying the movable barrier operator when the alignment between the movable barrier and the corresponding movable barrier track is unacceptable.

15. The method of claim 14 wherein:

the notifying the movable barrier operator whenever the obstacle sensor is not operable includes causing the movable barrier operator to stop moving the movable barrier in a first direction and to begin moving the movable barrier in a reverse direction; and the notifying the movable barrier operator whenever the alignment between the movable barrier and the corresponding movable barrier track is unacceptable includes causing the movable barrier operator to stop moving the movable barrier in the first direction and to not move the movable barrier in the reverse direction.

* * * * *